(12) United States Patent
Staufer

(10) Patent No.: US 10,451,279 B2
(45) Date of Patent: Oct. 22, 2019

(54) SEALING OF A RADIAL GAP BETWEEN EFFUSION TILES OF A GAS-TURBINE COMBUSTION CHAMBER

(71) Applicant: Rolls-Royce Deutschland Ltd & Co KG, Blankenfelde-Mahlow (DE)

(72) Inventor: Max Staufer, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 521 days.

(21) Appl. No.: 15/019,005

(22) Filed: Feb. 9, 2016

(65) Prior Publication Data

US 2016/0238247 A1     Aug. 18, 2016

(30) Foreign Application Priority Data

Feb. 12, 2015   (DE) .......................... 10 2015 202 570

(51) Int. Cl.
*F23R 3/00* (2006.01)
*F23R 3/06* (2006.01)
(Continued)

(52) U.S. Cl.
CPC ............ *F23R 3/002* (2013.01); *F16J 15/062* (2013.01); *F16J 15/08* (2013.01); *F23R 3/06* (2013.01);
(Continued)

(58) Field of Classification Search
CPC .......... F23R 3/002; F23R 2900/03041–03045; F23R 2900/00012; F23R 3/26; F23R 3/06;
(Continued)

(56) References Cited

U.S. PATENT DOCUMENTS 6,675,586 B2 *  1/2004  Maghon ................... F23M 5/08
                                                       431/243
6,901,757 B2    6/2005  Gerendas
                (Continued)

FOREIGN PATENT DOCUMENTS

DE      19727407 A1 *  1/1999  .............. F23R 3/002
EP       1310735 A1    5/2003
                (Continued)

OTHER PUBLICATIONS

German Search Report dated Oct. 30, 2015 from counterpart German App No. 10 2015 202 570.5.
(Continued)

*Primary Examiner* — Alain Chau
(74) *Attorney, Agent, or Firm* — Shuttleworth & Ingersoll, PLC; Timothy Klima

(57) ABSTRACT

A combustion chamber of a gas turbine with a combustion chamber wall to which effusion tiles are fastened which adjoin one another while forming a rim gap, with a seal being arranged in the area of said rim gap, characterized in that the effusion tiles at their rim facing the combustion chamber wall are provided with a bevel in order to form a sealing space, that a seal having a V-shaped cross-section is placed inside the sealing space and that the combustion chamber wall is provided with at least one recess to supply cooling air through the combustion chamber wall to that side of the seal facing the combustion chamber wall.

4 Claims, 3 Drawing Sheets

Figure 1:
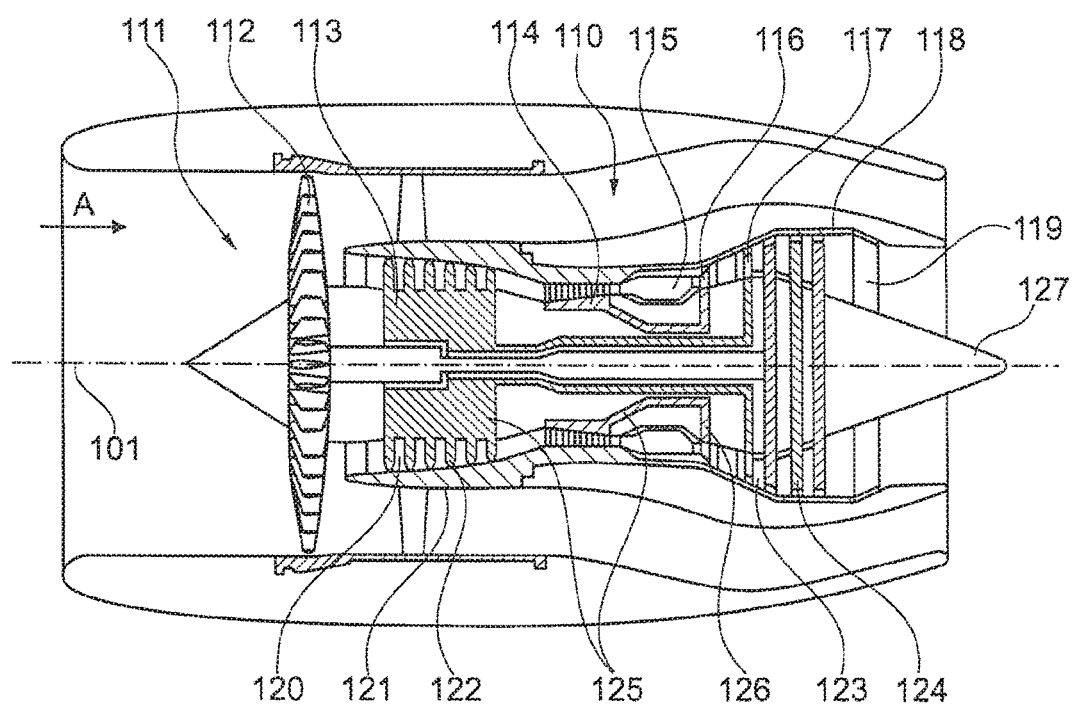

(51) Int. Cl.
*F23R 3/26* (2006.01)
*F16J 15/06* (2006.01)
*F16J 15/08* (2006.01)

(52) U.S. Cl.
CPC ..... *F23R 3/26* (2013.01); *F23M 2900/05005* (2013.01); *F23R 2900/00012* (2013.01); *F23R 2900/03041* (2013.01)

(58) Field of Classification Search
CPC .. F23M 2900/05005; F23M 5/04; F02C 7/28; F16J 15/062; F16J 15/08
See application file for complete search history.

(56) References Cited

U.S. PATENT DOCUMENTS

| | | | |
|---|---|---|---|
| 7,152,864 B2 | 12/2006 | Amos et al. | |
| 7,849,694 B2 | 12/2010 | Dahlke et al. | |
| 8,156,744 B2* | 4/2012 | Hernandez | F23R 3/002 60/746 |
| 8,359,865 B2 | 1/2013 | Dierberger et al. | |
| 8,695,989 B2* | 4/2014 | Dahlke | F23M 5/02 277/644 |
| 2005/0150233 A1* | 7/2005 | Glessner | F16B 5/0208 60/796 |
| 2005/0242525 A1* | 11/2005 | Dahlke | F23M 5/02 277/605 |
| 2005/0242526 A1* | 11/2005 | Dahlke | F01D 11/005 277/605 |
| 2007/0151249 A1* | 7/2007 | Barbeln | F23R 3/007 60/752 |
| 2011/0179798 A1* | 7/2011 | Pieussergues | F01D 9/023 60/752 |
| 2013/0019603 A1 | 1/2013 | Dierberger et al. | |
| 2013/0283818 A1* | 10/2013 | Flanagan | F01D 9/023 60/800 |
| 2015/0167557 A1* | 6/2015 | Thomas | F02C 7/28 60/796 |
| 2016/0033134 A1* | 2/2016 | Johnson | F23R 3/286 60/740 |

FOREIGN PATENT DOCUMENTS

| | | | | |
|---|---|---|---|---|
| EP | 1557611 A1 * | 7/2005 | | F23M 5/04 |
| EP | 1582699 A2 | 10/2005 | | |
| EP | 1591724 A1 * | 11/2005 | | F23M 5/04 |
| EP | 1591725 A2 | 11/2005 | | |
| EP | 2354660 A2 | 8/2011 | | |
| EP | 2511481 A2 | 10/2012 | | |
| EP | 2549188 A2 | 1/2013 | | |

OTHER PUBLICATIONS

European Search Report dated Jun. 27, 2016 for counterpart European Patent Application No. 16154683.3.
Office Action dated Jul. 11, 2018 for counterpart European Patent Application No. 16 154 683.3.

* cited by examiner

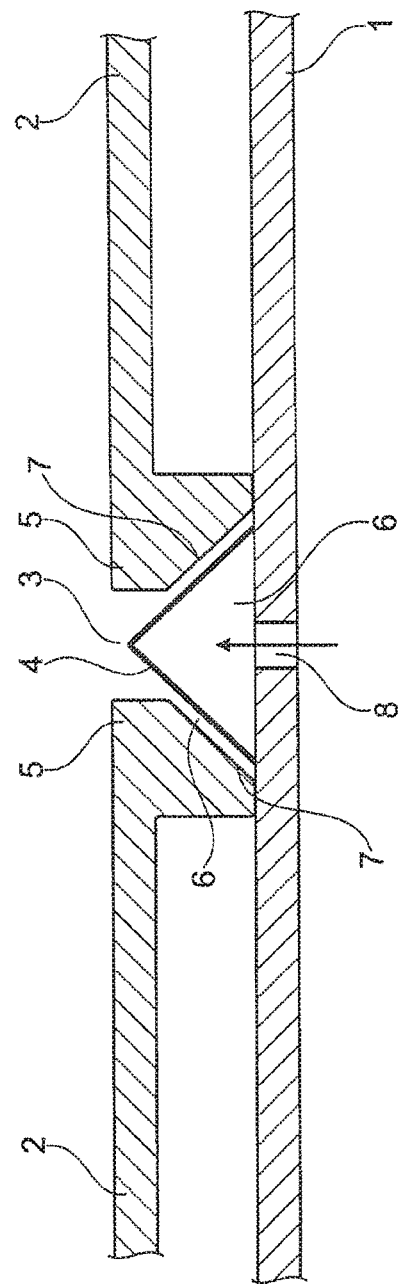

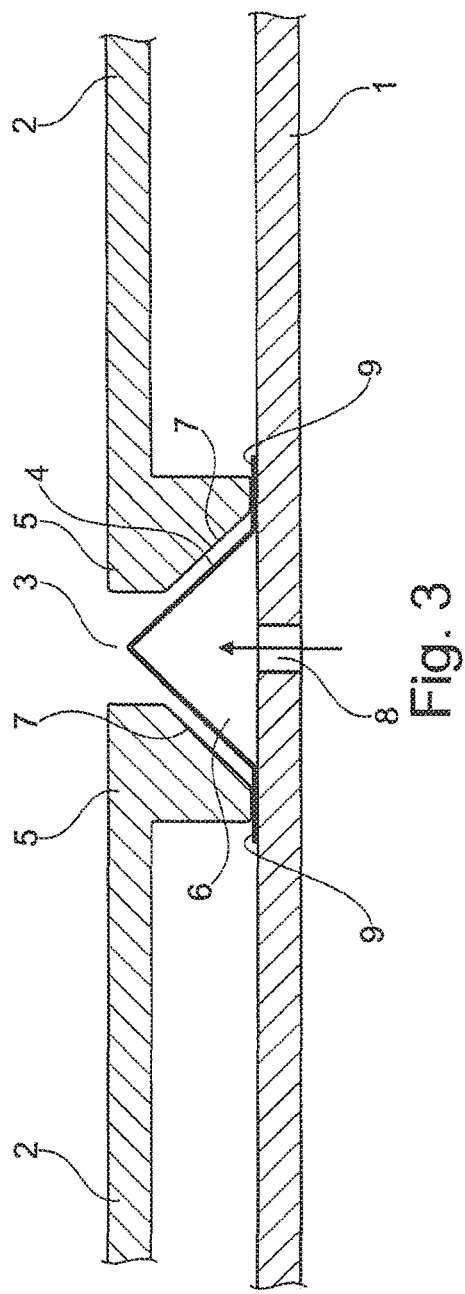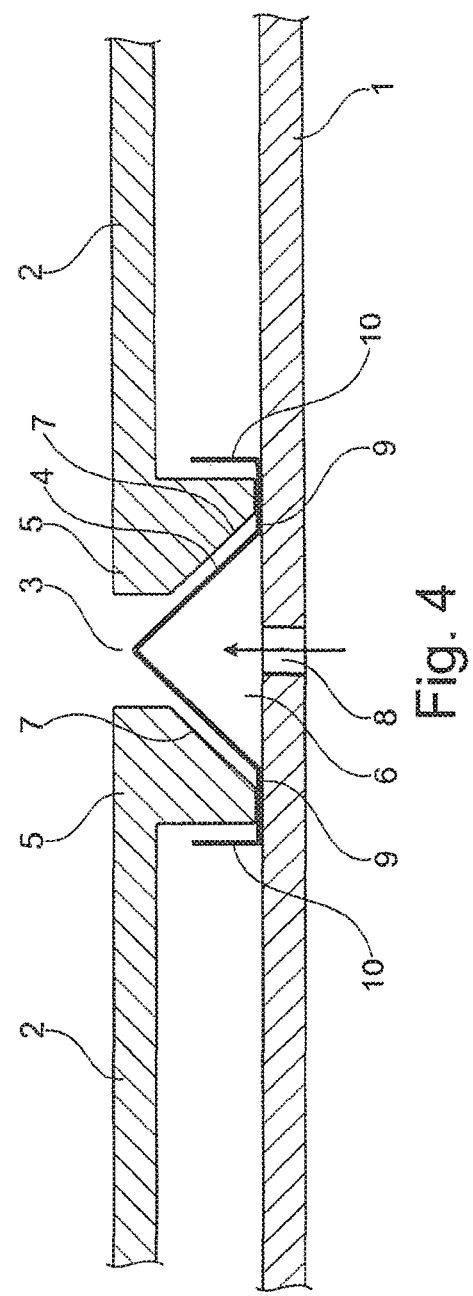

SEALING OF A RADIAL GAP BETWEEN EFFUSION TILES OF A GAS-TURBINE COMBUSTION CHAMBER

This application claims priority to German Patent Application 102015202570.5 filed Feb. 12, 2015, the entirety of which is incorporated by reference herein.

This invention relates to a sealing of a radial gap between effusion tiles of a gas-turbine combustion chamber and in particular to a combustion chamber of a gas-turbine in accordance with features as disclosed herein. The invention thus relates to a combustion chamber of a gas turbine with a combustion chamber wall to which effusion tiles are fastened which adjoin one another while forming a rim gap, with a seal being arranged in the area of said rim gap.

It is known from the state of the art that rim gaps are created between adjacent effusion tiles and are caused for example by tolerances of the effusion tiles or by differing thermal expansions. This problem is known from the state of the art, where different sealing elements are described which are intended to seal the rim gap against gap losses in the cooling air to be passed through the effusion tiles. It is also desirable to seal off the rim gap created between adjacent effusion tiles and the cavity thereby formed from the ingress of hot gas out of the combustion chamber and from a thermal radiation load.

EP 1 310 735 B1 shows a design in which the seal is designed strip-like and abuts the rims of the adjacent effusion tiles. The seal is positioned by lateral guides.

U.S. Pat. No. 6,675,586 B2 describes a design in which a U-shaped seal is used, whose side sections facing the combustion chamber are received in grooves of the effusion tiles.

U.S. Pat. No. 7,152,864 B2 shows a sealing element which is elastically pretensioned against those rims of the effusion tiles facing the combustion chamber wall. A similar solution is shown by U.S. Pat. No. 8,359,865 B2, where a substantially U-shaped sealing element is clamped between the effusion tiles and the combustion chamber wall. In accordance with U.S. Pat. No. 7,849,694 B2, it is provided that sealing strips are laid into grooves in the rims of the effusion tiles and pretensioned against the combustion chamber wall.

A disadvantage of the previously known designs is that the seals must each be secured and positioned by complicated design measures and that both their manufacture and fitting require heavy expenditure.

The object underlying the present invention is to provide a sealing of the type mentioned at the beginning which, while being simply designed and easily and cost-effectively producible, enables an effective sealing of the radial gap and an effective thermal insulation.

It is a particular object to provide a solution to the above problems by a combination of features as disclosed herein. Further advantageous embodiments will become apparent from the present disclosure.

It is provided in accordance with the invention that the effusion tiles at their rim facing the combustion chamber wall are provided with a bevel or recess extending along the rim in order to form a sealing space. A bevel or recess of this type can be manufactured simply and cost-effectively. Inside the sealing space formed by the bevels of the two adjacent effusion tiles, a seal is placed in accordance with the invention, having a cross-section which is manufactured to match and precisely fit the bevel or recess of the rim of the effusion tiles. The seal has for example a V-shaped cross-section, such that the seal can be brought into sealing contact with the bevel or the surface of the rim of the combustion chamber tile. It is furthermore provided that the combustion chamber wall has at least one recess which issues into the sealing space and is used to supply cooling air through the combustion chamber wall into said sealing space. The cooling air thus effects a pressure buildup on that side of the seal facing the combustion chamber wall. The seal is brought by this pressure into contact with the bevel or recess of the rim of the respective effusion tile. The result of this is effective sealing in a particularly simple manner.

In accordance with the invention, automatic centering and positioning of the seal is thus achieved. Furthermore, the seal is moved into a sealing position by the pressure applied by the cooling air and held in said position.

The solution in accordance with the invention thus leads to effective sealing of the rim gap and prevents hot gas being able to impact the combustion chamber wall through the rim gap. Furthermore, the seal achieves shielding of thermal radiation and thus protects the combustion chamber wall.

The seal in accordance with the invention does not need, as in the state of the art, to be fastened structurally: instead the seal centers itself and is moved into a sealing position by the pressure applied. This simplifies not only the manufacture of the combustion chamber tiles and of the seal, but also the assembly work necessary.

Sealing in accordance with the invention has the further substantial advantage that in the event of a failure of the seal the cooling effect of the cooling air flowing in through the recess leads to the rim of the effusion tile being cooled. This protects the effusion tile itself and prevents failure.

It is also possible to provide the seal with recesses in order to allow a defined quantity of cooling air for creation of a cooling firm on the tile rim.

In accordance with the invention, it is thus particularly advantageous when the seal is designed such that it is can be brought into sealing contact with the bevels or recesses of the combustion chamber tile rims.

The seal can for example be manufactured from a sheet metal material, with the result that the manufacturing expense is considerably reduced.

In a favourable embodiment of the invention, it is furthermore provided that the seal has lateral sections which are arranged between the rim of the effusion tile and the combustion chamber wall. This makes it possible to additionally provide sealing between the combustion chamber wall and the effusion tile to prevent any exit, through the rim gap, of the cooling air introduced into the intermediate space between the combustion chamber wall and the effusion tiles.

In a preferred development of the invention, it is provided that the side sections of the seal are provided with retaining areas intended for positive engagement with the rims of the effusion tiles. This ensures that the seal remains exactly positioned even in the non-operational state of the gas turbine.

The present invention is described in the following in light of the accompanying drawing, showing exemplary embodiments. In the drawing, FIG. 1 shows a gas-turbine engine for using the gas-turbine combustion chamber in accordance with the present invention, FIG. 2 shows a simplified sectional side view of a combustion chamber wall and of adjacent effusion tiles having a rim gap and an inventive seal in accordance with a first exemplary embodiment, FIG. 3 shows a view, by analogy with FIG. 2, of a further exemplary embodiment with side sections, and FIG. 4 shows a further exemplary embodiment in analogous representation with lateral retaining areas.

The gas-turbine engine 110 in accordance with FIG. 1 is a generally represented example of a turbomachine where the invention can be used. The engine 110 is of conventional design and includes in the flow direction, one behind the other, an air inlet 111, a fan 112 rotating inside a casing, an intermediate-pressure compressor 113, a high-pressure compressor 114, a combustion chamber 115, a high-pressure turbine 116, an intermediate-pressure turbine 117 and a low-pressure turbine 118 as well as an exhaust nozzle 119, all of which being arranged about an engine center axis 101.

The intermediate-pressure compressor 113 and the high-pressure compressor 114 each include several stages, of which each has an arrangement extending in the circumferential direction of fixed and stationary guide vanes 120, generally referred to as stator vanes and projecting radially inwards from the core engine casing 121 in an annular flow duct through the compressors 113, 114. The compressors furthermore have an arrangement of compressor rotor blades 122 which project radially outwards from a rotatable drum or disk 125 linked to hubs 126 of the high-pressure turbine 116 or the intermediate-pressure turbine 117, respectively.

The turbine sections 116, 117, 118 have similar stages, including an arrangement of fixed stator vanes 123 projecting radially inwards from the casing 121 into the annular flow duct through the turbines 116, 117, 118, and a subsequent arrangement of turbine blades 124 projecting outwards from a rotatable hub 126. The compressor drum or compressor disk 125 and the blades 122 arranged thereon, as well as the turbine rotor hub 126 and the turbine rotor blades 124 arranged thereon rotate about the engine center axis 101 during operation.

FIG. 2 shows in a simplified representation a combustion chamber wall 1. Effusion tiles 2 are fastened to it in a manner not shown. According to FIGS. 2 to 4, the effusion tiles 2 are apart at their rims 5, such that a rim gap 3 is formed.

As shown in particular in FIG. 2, that side of the rim 5 which faces the combustion chamber wall 1 and extends up to the rim gap 3 is provided with a bevel, so that a V-shaped cross-section is obtained, as can be seen from FIG. 2.

An elongated or strip-like seal 4, which can be manufactured from a sheet metal material and extends along the rim gap 3, is arranged in a sealing space 6 formed by the bevels 7. The bevel 7 and the V-shaped contour of the seal 4 are matched to one another, such that the seal 4 can be brought into sealing contact with the faces of the bevels 7.

The combustion chamber wall 1 has in the area of the rim gap 3 at least one recess 8, through which cooling air can be introduced into the sealing space 6. Since the seal 4 is in sealing contact with the bevels 7, a pressure builds up in the sealing space 6 and presses the seal 4 against the bevels 7 and positions it.

In the exemplary embodiment shown in FIG. 3, the seal has side sections 9 which are arranged between the rim 5 of the respective effusion tile 2 and the combustion chamber wall 1. The side sections 9 are used for additional sealing between the rim 5 of the effusion tile and the combustion chamber wall 1, to prevent an outflow of cooling air from the intermediate space between the combustion chamber wall 1 and the effusion tile 2.

FIG. 4 shows a further exemplary embodiment, by analogy with FIGS. 2 and 3, in which additional retaining areas 10 are provided on the outer rim areas of the side sections 9. These are, as can be seen in FIG. 4, bent upwards and are used for additional retaining of the seal 4.

LIST OF REFERENCE NUMERALS

1 Combustion chamber wall
2 Effusion tile
3 Rim gap
4 Seal
5 Rim
6 Sealing space
7 Bevel
8 Recess
9 Side section
10 Retaining area
101 Engine center axis
110 Gas-turbine engine/core engine
111 Air inlet
112 Fan
113 Intermediate-pressure compressor (compressor)
114 High-pressure compressor
115 Combustion chamber
116 High-pressure turbine
117 Intermediate-pressure turbine
118 Low-pressure turbine
119 Exhaust nozzle
120 Guide vanes
121 Core engine casing
122 Compressor rotor blades
123 Stator vanes
124 Turbine blades
125 Compressor drum or disk
126 Turbine rotor hub
127 Exhaust cone

What is claimed is:

1. A combustion chamber of a gas turbine comprising:
effusion tiles,
a combustion chamber wall to which the effusion tiles are fastened, the effusion tiles positioned adjacent one another to form a rim gap between adjacent effusion tiles,
wherein the effusion tiles include bevelled rims at the rim gap forming a sealing space,
a seal having a V-shaped cross-section being positioned inside the sealing space, the V-shaped cross-section corresponding to a shape of the sealing space caused by the bevelled rims such that the seal is engageable with the bevelled rims to form a sealing contact between the V-shaped cross-section and the bevelled rims, the V-shaped cross-section including an open side open toward the combustion chamber wall,
the combustion chamber wall including at least one duct to supply cooling air through the combustion chamber wall to the open side to pressurize the seal against the bevelled rims to assist with the sealing contact;
wherein the seal has lateral sections which are sandwiched between the bevelled rims and the combustion chamber wall.

2. The combustion chamber in accordance with claim 1, wherein the seal is formed from a sheet metal material.

3. The combustion chamber in accordance with claim 2, wherein the lateral sections include retaining areas positioned adjacent the bevelled rims for retaining the seal with respect to the bevelled rims.

4. The combustion chamber in accordance with claim 1, wherein the lateral sections include retaining areas positioned adjacent the bevelled rims for retaining the seal with respect to the bevelled rims.

* * * * *